United States Patent
Chen et al.

(10) Patent No.: US 9,344,267 B2
(45) Date of Patent: May 17, 2016

(54) DATA RECEIVER AND DATA RECEIVING METHOD THEREOF

(71) Applicant: AU OPTRONICS CORP., Hsin-Chu (TW)

(72) Inventors: Wei-Jyun Chen, Hsin-Chu (TW); Chun-Fan Chung, Hsin-Chu (TW); Chih-Fu Yang, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/487,617

(22) Filed: Sep. 16, 2014

(65) Prior Publication Data
US 2015/0381341 A1     Dec. 31, 2015

(30) Foreign Application Priority Data
Jun. 30, 2014   (TW) .............................. 103122554 A (51) Int. Cl.
*H03D 3/24*      (2006.01)
*H04L 7/00*      (2006.01)
*H04L 7/033*     (2006.01)
*H04L 7/04*      (2006.01)

(52) U.S. Cl.
CPC ............ *H04L 7/0087* (2013.01); *H04L 7/0331* (2013.01); *H04L 7/04* (2013.01)

(58) Field of Classification Search
CPC ........ H04L 7/0087; H04L 7/0331; H04L 7/04
USPC ....................................................... 375/375
See application file for complete search history.

(56) References Cited

U.S. PATENT DOCUMENTS

| | | | |
|---|---|---|---|
| 2001/0016476 A1 | 8/2001 | Kasahara et al. | |
| 2004/0162047 A1 | 8/2004 | Kasahara et al. | |
| 2005/0094718 A1* | 5/2005 | Pasternak et al. | ............. 375/219 |
| 2007/0087716 A1 | 4/2007 | Kasahara et al. | |
| 2007/0098112 A1 | 5/2007 | Kim et al. | |
| 2008/0137790 A1* | 6/2008 | Cranford ............... | H04L 7/0334 375/357 |
| 2008/0147897 A1* | 6/2008 | Talbot | ................................ 710/8 |
| 2008/0238489 A1* | 10/2008 | Sanduleanu et al. | ............. 327/42 |
| 2009/0052600 A1* | 2/2009 | Chen | ....................... H04L 25/14 375/359 |
| 2009/0146706 A1 | 6/2009 | You | |
| 2012/0306551 A1 | 12/2012 | Moon et al. | |

FOREIGN PATENT DOCUMENTS

TW        201242257        10/2012

* cited by examiner

*Primary Examiner* — David S Huang
(74) *Attorney, Agent, or Firm* — WPAT, PC; Justin King (57) ABSTRACT

A data receiver includes a serial-data processing module, a null-frequency detecting unit, a data checking unit, a status control unit and a timeout checking unit. The serial-data processing module receives serial data, generates an operation clock, parallel data and required data, and determines whether the operation clock is correct for accordingly generating a first result. The null-frequency detecting unit receives the operation clock and determines whether the operation clock is locked or null for accordingly generating a second result. The data checking unit is enabled according to the first result and determines whether checking data of the required data is correct for accordingly generating a third result. The status control unit outputs a frequency-locked signal and changes the signal state of the frequency-locked signal according to the first to third results. The enabled timeout checking unit resets the serial-data processing module according to the signal state of the frequency-locked signal.

8 Claims, 4 Drawing Sheets

DATA RECEIVER AND DATA RECEIVING METHOD THEREOF

TECHNICAL FIELD

The present disclosure relates to a data receiver and a data receiving method, and more particularly to a data receiver having a variety of detection functions and a data receiving method.

BACKGROUND

In a general data transmission technology, the transmitting terminal is configured to transmit the data signal (DATA) and the clock signal (CLK) to the receiving terminal separately; and the receiving terminal is configured to obtain the required data contained in the data signal according to the received clock signal. However, in the transmission path, the transmitted signal may be affected by the RC effects (i.e., resistance, capacitance effect) thereby being attenuated or distorted. In addition, because the data signal and the clock signals are transmitted separately, the two may have different degrees of resistance or capacitance effect; and consequentially, the correctness of the data received by the receiving terminal is also affected.

In order to improve the above problem, before being transmitted by the transmitting terminal, the data signal and the clock signal can be integrated into one piece of serial data, performed by an encoding operation, and then transmitted together. Then, when receiving the serial data, the receiving terminal restores the received serial data back to the required clock signal and have a specific operation according to the frequency of the restored clock signal. Thus, the data signal and the clock signal can have the same degree of resistance or capacitance effect; and consequentially, the correctness of the data received by the receiving terminal is improved.

However, the aforementioned solution still has some disadvantages. First, when the clock signal is being restored, the being-restored clock signal may be affected by noise and cannot be locked in a correct frequency. Second, when the clock signal is being restored, the being-restored clock signal may be affected by noise thereby being locked or null. Third, when the clock signal is being restored, the being-restored clock signal may be locked in a wrong frequency, for example, half or one-fourth of the correct frequency, due to the frequency change of the serial data. The aforementioned three issues may cause that the receiving terminal cannot receive correct data.

SUMMARY

An object of the present disclosure is to provide a data receiver capable of solving the aforementioned issues.

Another object of the present disclosure is to provide a data receiving method adapted to be used in the aforementioned data receiver.

The present disclosure discloses a data receiver, which includes a serial-data processing module, a null-frequency detecting unit, a data checking unit, a state control unit and a timeout detecting unit. The serial-data processing module is configured to receive a serial data, generate an operation clock according to the serial data, and dynamically modulate a frequency of the operation clock until the frequency of the operation clock is locked in a correct frequency. The serial-data processing module is further configured to restore the serial data back to a parallel data according to the operation clock, and perform a data latch operation on the parallel data according to the operation clock thereby restoring the parallel data back to a required data. The serial-data processing module is further configured to determine whether the frequency of the operation clock is correct or not and accordingly generate a first determination result, and determine, according to a reset control signal, whether to re-generate the operation clock or not according to the serial data. The null-frequency detecting unit is electrically coupled to the serial-data processing module and configured to receive the operation clock, determine whether the received operation clock is locked or null, and accordingly output a second determination result. The data checking unit is electrically coupled to the serial-data processing module and configured to be either enabled or disabled according to the first determination result. The enabled data checking unit is configured to obtain a checking data contained in the required data according to the operation clock, determine whether the checking data is correct or not and accordingly output a third determination result. The state control unit is electrically coupled to the serial-data processing module and configured to output a frequency-locked indication signal and change a state of the frequency-locked indication signal according to the first, second and third determination results. The timeout detecting unit is electrically coupled to an output terminal of the status control unit and configured to determine whether the state of the frequency-locked indication signal is not converted into a predetermined state in a predetermined time or not and generate the reset control signal when the state of the frequency-locked indication signal is not converted into the predetermined state in the predetermined time.

The present disclosure discloses a data receiving method, which is adapted to be used in a data receiver comprising a clock recovery unit. The data receiving method includes: configuring the clock recovery unit to generate an operation clock according to a serial data, and configuring the data receiver to enter into a training mode thereby dynamically modulating a frequency of the operation clock through the clock recovery unit; determining whether the operation clock is locked in a correct frequency or not in a predetermined time; resetting the clock recovery unit and configuring the data receiver to re-enter into the training mode when it is determined that the operation clock is not locked in the correct frequency in the predetermined time, alternatively, configuring the data receiver to enter into a confirmation mode when it is determined that the operation clock is locked in the correct frequency in the predetermined time, wherein in the confirmation mode, the data receiving method determines whether the operation clock is locked in the correct frequency or not again; configuring the data receiver to enter into a receiving mode when it is determined that the operation clock is locked in the correct frequency again, wherein in the receiving mode, the data receiver is configured to start to have a normal function, keep determining whether the operation clock is locked or null or not, and keep determining whether the operation clock is locked in the correct frequency or not; and resetting the clock recovery unit and configuring the data receiver to re-enter into the training mode when it is determined that the operation clock is locked or null in the receiving mode or when it is determined that the operation clock is not locked in the correct frequency.

In summary, the data receiver of the present disclosure employs a serial-data processing module, a null-frequency detecting unit and a data checking unit for determining whether the frequency of the recovery operation clock is correct or not and accordingly generating the first determination result, determining whether the frequency of the recovery operation clock is dead-locked or null or not and accordingly generating the second determination result and determining whether the checking data contained in the required data is correct or not and accordingly generating the third determination result, respectively. In addition, the data receiver of the present disclosure further employs the state control unit for determining the state of the frequency-locked indication signal according to the first, second and third determination results and employs the timeout detecting unit for determining whether the state of the frequency-locked indication signal is converted to a predetermined state or not in a predetermined time thereby determining whether to reset the serial-data processing module or not. Thus, the three issues described in the conventional technology can be solved in the data receiver of the present disclosure.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
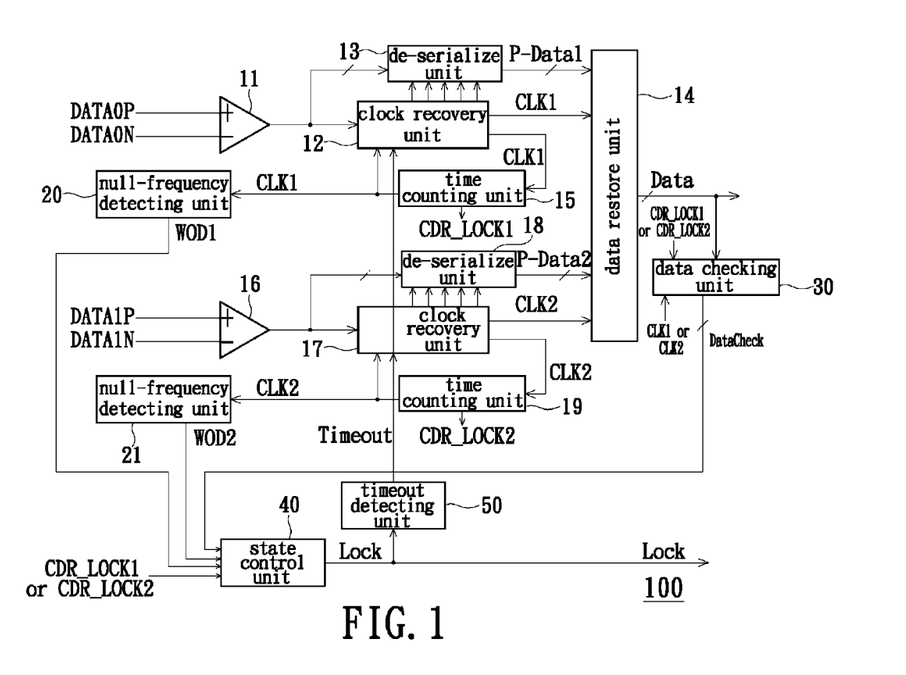
FIG. 1 is a circuit block view of a data receiver in accordance with an embodiment of the present disclosure.

FIG. 1 is a circuit block view of a data receiver in accordance with an embodiment of the present disclosure. As shown, the data receiver 100 in the present embodiment includes signal receiving units 11, 16, clock recovery units 12, 17, de-serialize units 13, 18, a data restore unit 14, time counting units 15, 19, null-frequency detecting units 20, 21, a data checking unit 30, a state control unit 40 and a timeout detecting unit 50. In the present embodiment, the signal receiving unit 11, the clock recovery unit 12, the de-serialize unit 13, the data restore unit 14 and the time counting unit 15 together refer to as a serial-data processing module, which is configured to process the serial data transmitted by differential signals DATA0P, DATA0N.

Similarly, the signal receiving unit 16, the clock recovery unit 17, the de-serialize unit 18, the data restore unit 14 and the time counting unit 19 together refer to as another serial-data processing module, which is configured to process another serial data transmitted by differential signals DATA1P, DATA1N. It is to be noted that the data receiver 100 includes two serial-data processing modules and each is configured to process a piece of serial data; thus, the data receiver 100 can transmit two-bit data at the same time. However, the present disclosure is not limited to the aforementioned circuit design. To those ordinarily skilled in the art, it is understood that the data receiver of the present disclosure may employ one or more than two serial-data processing modules in response to the actual requirement of data processing speed. As shown in FIG. 1, after receiving the serial data transmitted by the differential signals DATA0P, DATA0N, the serial-data processing module (constituted by the signal receiving unit 11, the clock recovery unit 12, the de-serialize unit 13, the data restore unit 14 and the time counting unit 15) is configured to generate an operation clock CLK1 according to the received serial data and dynamically modulate the frequency of the operation clock CLK1 until the frequency of the operation clock CLK1 is locked in a correct frequency; wherein the correct frequency herein refers to the operation frequency at the transmitting terminal. This serial-data processing module is further configured to restore the received serial data back to parallel data P-Data1 according to the operation clock CLK1. This serial-data processing module is further configured to determine whether the frequency of the operation clock CLK1 is correct or not and accordingly generate a determination result CDR_LOCK1 and determine, according to a reset control signal Timeout, whether to re-generate the operation clock CLK1 or not according to the received serial data.

As shown in FIG. 1, after receiving another serial data transmitted by the differential signals DATA1P, DATA1N, the serial-data processing module (constituted by the signal receiving unit 16, the clock recovery unit 17, the de-serialize unit 18, the data restore unit 14 and the time counting unit 19) is configured to generate an operation clock CLK2 (in theory, the operation clock CLK2 has a frequency same as that of the operation clock CLK1) according to the received serial data and dynamically modulate the frequency of the operation clock CLK2 until the frequency of the operation clock CLK2 is locked in a correct frequency. This serial-data processing module is further configured to restore the received serial data back to parallel data P-Data2 according to the operation clock CLK2. This serial-data processing module is further configured to determine whether the frequency of the operation clock CLK2 is correct or not and accordingly generate a determination result CDR_LOCK2 and determine, according to the reset control signal Timeout, whether to re-generate the operation clock CLK2 or not according to the received serial data. In theory, because the operation clocks CLK1, CLK2 have the same frequency, the determination results CDR_LOCK1, CDR_LOCK2 should have the same content. In addition, the data restore unit 14, in both of the serial-data processing modules, is configured to perform the data latch operation on the parallel data P-Data1, P-Data2 according to any one of the operation clocks CLK1, CLK2 thereby restoring the parallel data P-Data1, P-Data2 back to the required data Data. In other words, by requiring any one of the operation clocks CLK1, CLK2 only, the data restore unit 14 can successfully perform the data latch operation.

The function and operation of each unit/element in the data receiver 100 will be described in detailed as follow. Please refer to FIG. 1, again. The signal receiving unit 11 is configured to receive the serial data transmitted by the differential signals DATA0P, DATA0N and then output the received serial data. The clock recovery unit 12 is electrically coupled to the output terminal of the signal receiving unit 11 and configured to generate the operation clock CLK1 according to the serial data outputted from the signal receiving unit 11. In addition, the clock recovery unit 12 is further configured to dynamically modulate the frequency of the operation clock CLK1 until the frequency of the operation clock CLK1 is locked in a correct frequency. The de-serialize unit 13, electrically coupled to the output terminal of the signal receiving unit 11 and the output terminal of the clock recovery unit 12, is configured to restore the serial data outputted from the signal receiving unit 11 back to the parallel data P-Data1 according to the operation clock CLK1. The time counting unit 15 is electrically coupled to the output terminal of the clock recovery unit 12 and configured to receive and output the operation clock CLK1, determine whether the frequency of the operation clock CLK1 is correct or not and accordingly generate the determination result CDR_LOCK1. The null-frequency detecting unit 20 is electrically coupled to the output terminal of the time counting unit 15 and configured to receive the operation clock CLK1, determine whether the received operation clock CLK1 is dead-locked or null or not and accordingly output a determination result WOD1.

The signal receiving unit 16 is configured to receive the serial data transmitted by the differential signals DATA1P, DATA1N and then output the received serial data. The clock recovery unit 17 is electrically coupled to the output terminal of the signal receiving unit 16 and configured to generate the operation clock CLK2 according to the serial data outputted from the signal receiving unit 16. In addition, the clock recovery unit 17 is further configured to dynamically modulate the frequency of the operation clock CLK2 until the frequency of the operation clock CLK2 is locked in a correct frequency. The de-serialize unit 18, electrically coupled to the output terminal of the signal receiving unit 16 and the output terminal of the clock recovery unit 17, is configured to restore the serial data outputted from the signal receiving unit 16 back to the parallel data P-Data2 according to the operation clock CLK2. The time counting unit 19 is electrically coupled to the output terminal of the clock recovery unit 17 and configured to receive and output the operation clock CLK2, determine whether the frequency of the operation clock CLK2 is correct or not and accordingly generate the determination result CDR_LOCK2. The null-frequency detecting unit 21 is electrically coupled to the output terminal of the time counting unit 19 and configured to receive the operation clock CLK2, determine whether the received operation clock CLK2 is dead-locked or null or not and accordingly output a determination result WOD2.

The data restore unit 14, electrically coupled to the output terminal of de-serialize unit 13, the output terminal of the clock recovery unit 12, the output terminal of the de-serialize unit 18 and the output terminal of the clock recovery unit 17, is configured to perform the data latch operation on the parallel data P-Data1, P-Data2 according to any one of the operation clocks CLK1, CLK2 thereby restoring the parallel data P-Data1, P-Data2 back to the required data DATA. The data checking unit 30 is electrically coupled to the output terminal of the data restore unit 14, at least one of the output terminals of the clock recovery units 12, 17, and at least one of the output terminals of the time counting units 15, 19. The data checking unit 30 is configured to be either enabled or disabled according to one of the determination results CDR_LOCK1, CDR_LOCK2. The enabled data checking unit 30 is configured to obtain checking data (not shown) contained in the required data DATA according to one of the operation clocks CLK1, CLK2, determine whether the obtained checking data is correct or not, and accordingly output a determination result DataCheck. It is indicated that the frequency of the operation clock received by the data checking unit 30 is correct (that is, the frequency of the operation clock is locked in a correct frequency) when the checking data is correct; alternatively, it is indicated that the frequency of the operation clock received by the data checking unit 30 is not correct.

The state control unit 40 is electrically coupled to at least one of the output terminals of the time counting units 15, 19, the output terminals of the null-frequency detecting units 20, 21 and the output terminal of the data checking unit 30. The state control unit 40 is configured to output a frequency-locked indication signal Lock and change the state (that is, a high level or a low level) of the frequency-locked indication signal Lock according to the determination results CDR_LOCK1 or CDR_LOCK2, the determination results WOD1 and WOD2 and the determination result DataCheck. In the present embodiment, the state control unit 40 is configured to change the state of the frequency-locked indication signal Lock from a low level to a high level when the determination result CDR_LOCK1 or CDR_LOCK2 indicates that the corresponding operation clock is locked in the correct frequency, both of the determination results WOD1 and WOD2 indicate that the corresponding operation clock is neither dead-locked nor null, and the determination result DataCheck indicates that the checking data is correct (that is, the frequency of the operation clock received by the data checking unit 30 is correct).

Alternatively, the state control unit 40 is configured to maintain the state of the frequency-locked indication signal Lock at a low level when the determination result CDR_LOCK1 or CDR_LOCK2 indicates that the corresponding operation clock is not locked in the correct frequency, any one of the determination result WOD1 or WOD2 indicates that the corresponding operation clock is dead-locked or null, or the determination result DataCheck indicates that the checking data is not correct. The timeout detecting unit 50 is electrically coupled to the output terminal of the status control unit 40 and configured to determine whether the state of the frequency-locked indication signal Lock is not converted into a predetermined state (for example, a high level) or not in a predetermined time. Specifically, when it is determined that the state of the frequency-locked indication signal Lock is not converted into the predetermined state in the predetermined time, the timeout detecting unit 50 is configured to generate the reset control signal Timeout thereby resetting the clock recovery units 12, 17 through the reset control signal Timeout; and consequentially the clock recovery units 12, 17 can re-generate the operation clocks CLK1, CLK2 according to the received serial data. Thus, according to the above description, it is understood that the three issues described in the conventional technology can be solved in the data receiver 100 of the present disclosure.

The following is the supplement information for the operation of the data receiver 100 in an embodiment of the present disclosure. To facilitate a better understanding of the present disclosure, the data receiver 100 in the present embodiment is specifically used for the field of display technology; however, it is understood that the present disclosure is not limited thereto. In the present embodiment, the data receiver 100 is used to implement a part of the circuit of a source driver (not shown) and is configured to receive two pieces of serial data from a transmitting terminal (not shown); wherein one piece of serial data is transmitted by the differential signals DATA0P, DATA0N and the other piece of serial data is transmitted by the differential signals DATA1P, DATA1N. The transmitting terminal in the present embodiment is implemented with a timing controller in a related display apparatus, and the timing controller is configured to have a specific operation (for example, determine the content of the outputted serial data; the detail will be described later) according to the state of the frequency-locked indication signal Lock outputted from the data receiver 100.

Because the data receiver 100 does not receive any data before the timing controller transmitting data to the data receiver 100, the state (for example, a low level) of the frequency-locked indication signal Lock generated by the data receiver 100 of course indicates that both of the operation clocks CLK1, CLK2 are not locked in the correct frequency. Therefore, when the timing controller starts to transmit the serial data to the data receiver 100, the transmitted serial data contains only a plurality of packets of checking data; wherein these packets of checking data can be, for example, implemented with the data in the horizontal scanning blank period of the display apparatus (hereinafter the data refers to as data BK). Thus, the data receiver 100 enters into a training mode and is configured to generate the operation clocks CLK1, CLK2 through the clock recovery units 12, 17 and dynamically modulate the operation clocks CLK1, CLK2. When any one of the operation clocks CLK1, CLK2 cannot be locked in the correct frequency, the state control unit 40 maintains the state the frequency-locked indication signal Lock at a low level. Thus, when determining that the state the frequency-locked indication signal Lock is not converted to a high level in a predetermined time, the timeout detecting unit 50 generates the reset control signal Timeout to reset the clock recovery units 12, 17 thereby configuring the clock recovery units 12, 17 to re-generate the operation clocks CLK1, CLK2 according to the currently-received serial data.

When the determination results CDR_LOCK2, CDR_LOCK1 generated by the time counting units 15, 19 indicate that the operation clocks CLK1, CLK2 are locked in the correct frequency, the data checking unit 30 is enabled thereby configuring the data receiver 100 to enter into a confirmation mode. At the beginning of the confirmation mode, because the determination result DataCheck outputted from the data checking unit 30 has not indicated that the checking data is correct, the state control unit 40 still maintains the state of the frequency-locked indication signal Lock at a low Level, thereby configuring the timing controller to keep transmitting the data BK to the data receiver 100. Thus, the data checking unit 30 can keep checking the correctness of the data BK so as to further determine whether the frequency of the received operation clock is correct or not (this process may refer to re-determine whether the operation clock is locked in the correct frequency or not).

In the present embodiment, the state control unit 40 is configured to change the state of the frequency-locked indication signal Lock from a low level to a high level when the determination result CDR_LOCK1 or CDR_LOCK2 indicates that the corresponding operation clock is locked in the correct frequency, both of the determination results WOD1 and WOD2 indicate that the corresponding operation clock is neither dead-locked nor null, and the determination result DataCheck indicates that the checking data is correct. Thus, the data receiver 100 enters into the receiving mode and starts to have normal operations; and the timing controller starts to transmit normal data to the data receiver 100. The normal data herein refers to as the data required by each scan line in the scanning period of the display apparatus, and the data generally contains one packet of data BAC, one packet of data POL, a plurality of packets of display data, one packet of data EOL and a plurality of packets of data BK. In one embodiment, the data BAC is for indicating the start point of the data of a respective scan line; the data POL is for the control of the liquid crystal polarity inversion; each packet of display data corresponds to a pixel; the data EOL is for indicating the terminal point of the data of a respective scan line; and the function of the data BK has been described above, and no redundant detail is to be given herein.

In the receiving mode, the null-frequency detecting units 20, 21 are configured to keep determining that whether the received operation clock is dead-locked or null or not. Specifically, once any one of the determination results WOD1, WOD2 generated by the null-frequency detecting units 20, 21 indicates that the respective operation clock is dead-locked or null, the state control unit 40 converts the state of the frequency-locked indication signal Lock from a high level to a low level, thereby configuring the timeout detecting unit 50 to generate the reset control signal Timeout to reset the clock recovery units 12, 17. Additionally, in the receiving mode, the data checking unit 30 is configured to keep obtaining the data BK contained in the required data Data according to the operation clock CLK1 or CLK2 and determine the correctness of the data BK. Once determining that the data BK is not correct (that is, the operation clock received by the data checking unit 30 is not locked in the correct frequency), the data checking unit 30 outputs corresponding determination result DataCheck thereby configuring the timeout detecting unit 50 to generate the reset control signal Timeout to reset the clock recovery units 12, 17.

In the receiving mode, it is understood that once any one of the determination results CDR_LOCK2, CDR_LOCK1 generated by the time counting units 15, 19 indicates that the respective operation clock is not locked in the correct frequency, the state control unit 40 is configured to convert the state of the frequency-locked indication signal Lock from a high level to a low level thereby configuring the timeout detecting unit 50 to generate the reset control signal Timeout to reset the clock recovery units 12, 17. Once the clock recovery units 12, 17 are reset, the data receiver 100 re-enters into the training mode.

Figure 2:
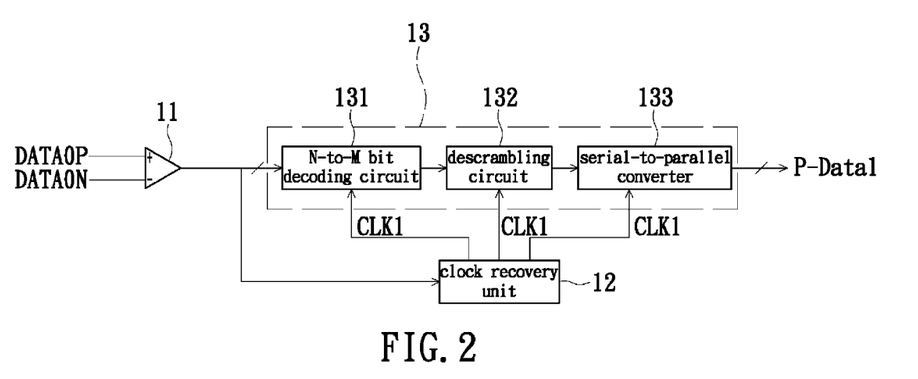
FIG. 2 is a circuit block view of a de-serialize unit in accordance with an embodiment of the present disclosure.

FIG. 2 is a circuit block view of a de-serialize unit in accordance with an embodiment of the present disclosure; wherein the de-serialize unit is exemplified by the de-serialize unit 13 in FIG. 1. As shown, the de-serialize unit 13 includes an N-to-M bit decoding circuit 131, a descrambling circuit 132 and a serial-to-parallel converter 133. The N-to-M bit decoding circuit 131, electrically coupled to the output terminal of the signal receiving unit 11 and the output terminal of the clock recovery unit 12, is configured to perform a decoding operation on the output signal of the signal receiving unit 11 according to the operation clock CLK1; wherein N and M are positive integers, and N>M. In the present embodiment, specifically, the N-to-M bit decoding circuit 131 is configured to convert each pocket contained in the received serial data from 9 bits to 8 bits; in other words, N=9 and M=8 in the present embodiment. However, the values of N, M can be adjusted based on the actual circuit design, and the present disclosure is not limited thereto.

The descrambling circuit 132, electrically coupled to the output terminal of the N-to-M bit decoding circuit 131 and the output terminal of the clock recovery unit 12, is configured to perform a descrambling operation on the output signal of the N-to-M bit decoding circuit 131 according to the operation clock CLK1. The serial-to-parallel converter 133, electrically coupled to the output terminal of the descrambling circuit 132 and the output terminal of the clock recovery unit 12, is configured to perform a serial-to-parallel operation on the output signal of the descrambling circuit 132 according to the operation clock CLK1 thereby generating the parallel data P-Data1. According to the circuit block view of the de-serialize unit 13 of FIG. 2, it is understood that the transmitting terminal (not shown) of the data receiver 100 has a corresponding circuit structure. In other words, the transmitting terminal may include a parallel-to-serial converter, a descrambling circuit and an M-to-N bit decoding circuit. Specifically, the descrambling circuit is configured to perform a descrambling operation on the output signal of the parallel-to-serial converter; and the M-to-N bit decoding circuit is configured to perform a decoding operation on the output signal of the descrambling circuit.

Please refer to FIG. 1, again. Both of the clock recovery units 12, 17 can be implemented with either phase locked loop (PLL) or delay locked loop (DLL). When a phase locked loop is adopted, the phase locked loop is electrically coupled to the output terminal of the signal receiving unit 11 or 16 and configured to generate the operation clock CLK1 or CLK2, determine a phase difference between the received serial data and the generated operation clock, and accordingly dynamically modulate the frequency of the generated operation clock. When a delay locked loop is adopted, the delay locked loop is electrically coupled to the output terminal of the signal receiving unit 11 or 16 and configured to generate the operation clock CLK1 or CLK2, determine a phase difference between the received serial data and the generated operation clock, and accordingly dynamically modulate the frequency of the generated operation clock. It is understood that present disclosure is not limited to the phase locked loop or the delay locked loop; any circuit with phase comparison function or frequency comparison function is in the scope of the claim of the present disclosure.

Figure 3:
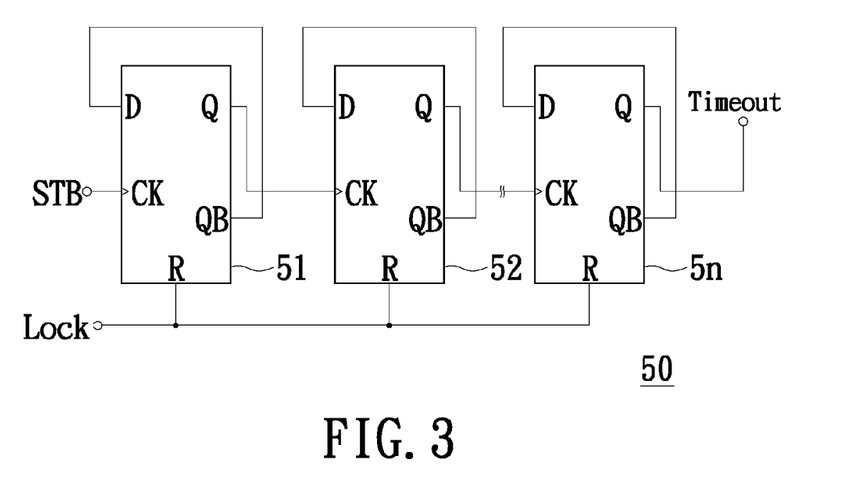
FIG. 3 is an internal circuit view of a timeout detecting unit in accordance with an embodiment of the present disclosure.

FIG. 3 is an internal circuit view of a timeout detecting unit in accordance with an embodiment of the present disclosure. As shown, the timeout detecting unit 50 in the present embodiment includes a plurality of serially-coupled D-type flip-flops 51~5n. Each D-type flip-flop has a data input terminal D, a clock input terminal CK, a data output terminal Q, a complementary data output terminal QB and a reset signal input terminal R. In the present embodiment, each D-type flip-flop is configured to have its reset signal input terminal R for receiving the frequency-locked indication signal Lock and its data input terminal D electrically coupled to its complementary data output terminal QB. The first-stage D-type flip-flop 51 is configured to have its clock input terminal CK for receiving a reference clock STB. Each one of the D-type flip-flops 52~5n is configured to have its clock input terminal CK electrically coupled to the data output terminal Q of the previous-stage D-type flip-flop. The last-stage D-type flip-flop 5n is configured to have its data output terminal Q for outputting the reset control signal Timeout. In the present embodiment, the reference clock STB may be implemented with the signal STB in the display apparatus; wherein the signal STB is for indicating the source driver to output latch data corresponding to a scan line.

As shown in FIG. 3, it is to be noted that each D-type flip-flop will be reset when the frequency-locked indication signal Lock has a high level; thus, the last-stage D-type flip-flop 5n is configured not to output the reset control signal Timeout. Alternatively, because each D-type flip-flop will not be reset when the frequency-locked indication signal Lock has a low level, these D-type flip-flops are configured to sequentially transmit data stage by stage and the last-stage D-type flip-flop 5n is configured to output the reset control signal Timeout; thus, the time counting operation is complete. It is understood that the time for the timeout detecting unit 50 to generate the reset control signal Timeout increases with the increasing number of the serially-coupled D-type flip-flops in the timeout detecting unit 50. In other words, the predetermined time counted by the timeout detecting unit 50 is proportional to the number of the serially-coupled D-type flip-flops disposed in the timeout detecting unit 50.

Figure 4:
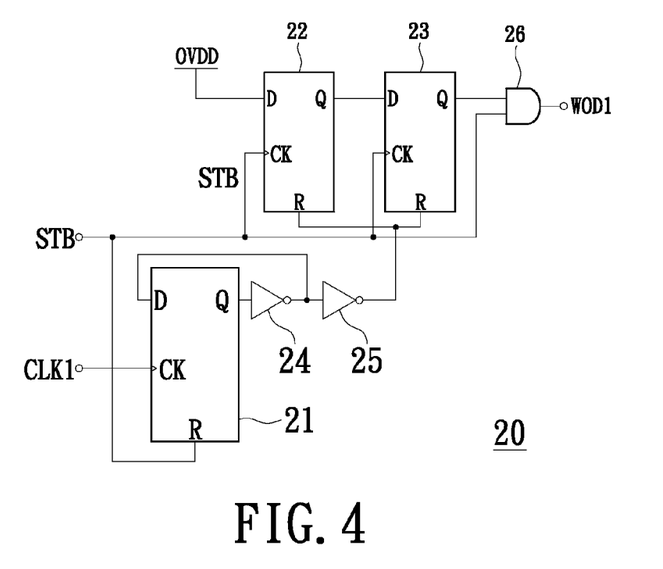
FIG. 4 is an internal circuit view of a null-frequency detecting unit in accordance with an embodiment of the present disclosure.

FIG. 4 is an internal circuit view of a null-frequency detecting unit in accordance with an embodiment of the present disclosure; wherein the null-frequency detecting unit is exemplified by the null-frequency detecting unit 20 in FIG. 1. As shown, the null-frequency detecting unit 20 in the present embodiment includes D-type flip-flops 21~23, inverters 24, 25 and an AND gate 26. Each D-type flip-flop includes a data input terminal D, a clock input terminal CK, a data output terminal Q and a reset signal input terminal R. The D-type flip-flop 21 is configured to have its clock input terminal CK for receiving the operation clock CLK1 and its reset signal input terminal R for receiving a reference clock STB; wherein the reference clock STB has a frequency smaller than that of the operation clock CLK1. In the present embodiment, the reference clock STB may be implemented with the signal STB in the display apparatus; wherein the signal STB is for indicating the source driver to output latch data corresponding to a respective scan line.

The inverter 24 is configured to have its input terminal electrically coupled to the data output terminal Q of the D-type flip-flop 21 and its output terminal electrically coupled to the data input terminal D of the D-type flip-flop 21. The inverter 25 is configured to have its input terminal electrically coupled to the output terminal of the inverter 24. The D-type flip-flops 22, 23 are coupled in series. Both of the D-type flip-flops 22, 23 are configured to have their reset signal input terminals R electrically coupled to the output terminal of the inverter 25; and their clock input terminals CK for receiving the reference clock STB. The data input terminal D of the first-stage D-type flip-flop 22 is electrically coupled to the direct power source OVDD. The data input terminal D of the next-stage D-type flip-flop 23 is electrically coupled to the data output terminal Q of the first-stage D-type flip-flop 22. The AND gate 26 is configured to receive the reference clock STB and the output signal of the data output terminal Q of the last-stage D-type flip-flop 23 and accordingly generate the determination result WOD1.

As shown in FIG. 4, it is to be noted that when the frequency of the operation clock CLK1 is not dead-locked or null, the inverter 25 is configured to normally generate the output signal for resetting the D-type flip-flops 22, 23; thus, the determination result WOD1 outputted from the AND gate 26 is maintained at a low level. However, when the frequency of the operation clock CLK1 is dead-locked or null, the inverter 25 is configured not to generate the output signal for resetting the D-type flip-flops 22, 23; thus, the D-type flip-flops 22, 23 are configured to sequentially transmit data stage by stage thereby configuring the determination result WOD1 outputted form the AND gate 26 at a high level in a specific period. In addition, it is understood that in the null-frequency detecting unit 20, the time for determining whether the determination result WOD1 has a high level or not increases with the increasing number of the D-type flip-flops serially coupled between the direct power OVDD and the AND gate 26. Thus, the number of the D-type flip-flops serially coupled between the direct power OVDD and the AND gate 26 is adjustable in response to an actual circuit design.

It is understood that the data receiver 100 may further include two equalizer units (not shown); each is electrically coupled between the serial data received by the data receiver 100 and the input terminal of the respective signal receiving unit.

Figure 5:
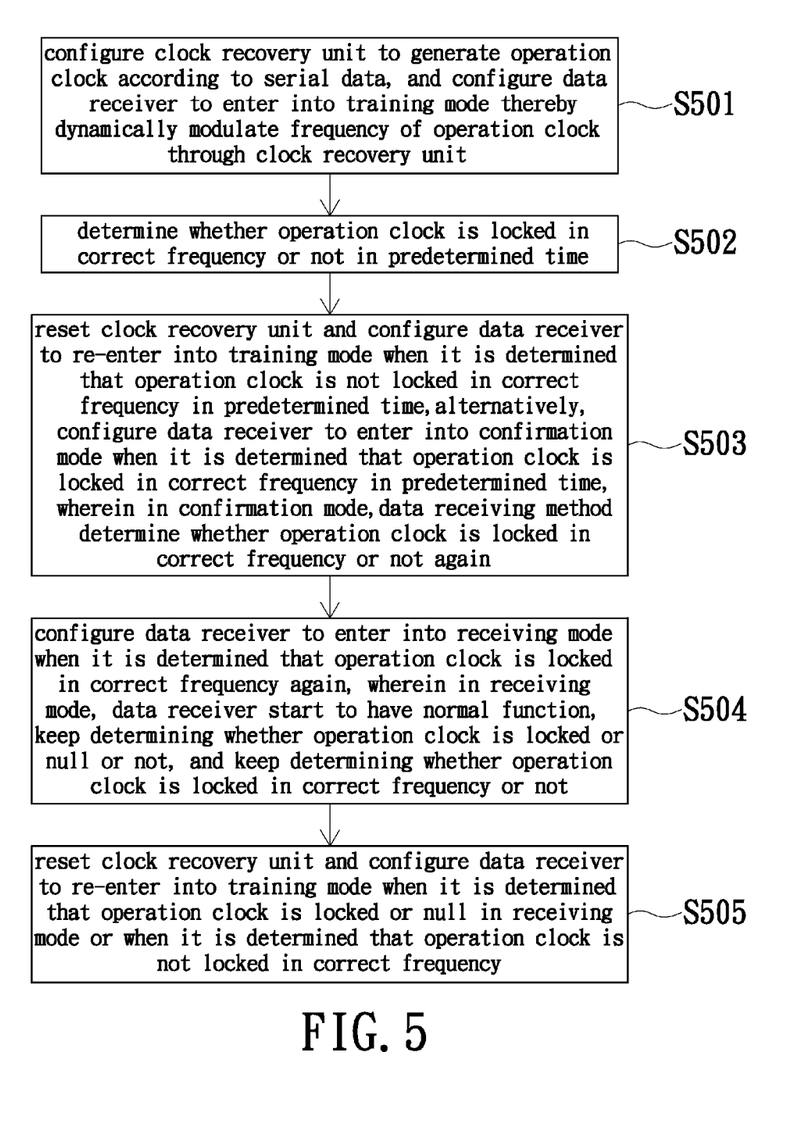
FIG. 5 is a flowchart illustrating a data receiving method in accordance with an embodiment of the present disclosure.

According to the teachings of the aforementioned embodiments, a data receiving method is developed by those ordinarily skilled in the art. FIG. 5 is a flowchart illustrating a data receiving method in accordance with an embodiment of the present disclosure; wherein the data receiving method is adapted to be used in a data receiver including a clock recovery unit. As shown, the data receiving method includes steps of: configuring the clock recovery unit to generate an operation clock according to a serial data, and configuring the data receiver to enter into a training mode thereby dynamically modulating a frequency of the operation clock through the clock recovery unit (step S501); determining whether the operation clock is locked in a correct frequency or not in a predetermined time (step S502); resetting the clock recovery unit and configuring the data receiver to re-enter into the training mode when it is determined that the operation clock is not locked in the correct frequency in the predetermined time, alternatively, configuring the data receiver to enter into a confirmation mode when it is determined that the operation clock is locked in the correct frequency in the predetermined time, wherein in the confirmation mode, the data receiving method determines whether the operation clock is locked in the correct frequency or not again (step S503); configuring the data receiver to enter into a receiving mode when it is determined that the operation clock is locked in the correct frequency again, wherein in the receiving mode, the data receiver is configured to start to have a normal function, keep determining whether the operation clock is dead-locked or null or not, and keep determining whether the operation clock is locked in the correct frequency or not (step S504); and resetting the clock recovery unit and configuring the data receiver to re-enter into the training mode when it is determined that the operation clock is dead-locked or null in the receiving mode or when it is determined that the operation clock is not locked in the correct frequency (step S505).

In addition, the data receiving method further includes a step of: resetting the clock recovery unit and configuring the data receiver to re-enter into the training mode when it is determined that the operation clock is not locked in the correct frequency again. In addition, the data receiving method further includes a step of: maintaining the data receiver in the receiving mode when it is determined that the operation clock is not dead-locked or not null or when it is determined that the operation clock is locked in the correct frequency.

In summary, the data receiver of the present disclosure employs a serial-data processing module, a null-frequency detecting unit and a data checking unit for determining whether the frequency of the recovery operation clock is correct or not and accordingly generating the first determination result, determining whether the frequency of the recovery operation clock is dead-locked or null or not and accordingly generating the second determination result and determining whether the checking data contained in the required data is correct or not and accordingly generating the third determination result, respectively. In addition, the data receiver of the present disclosure further employs the state control unit for determining the state of the frequency-locked indication signal according to the first, second and third determination results and employs the timeout detecting unit for determining whether the state of the frequency-locked indication signal is converted to a predetermined state or not in a predetermined time thereby determining whether to reset the serial-data processing module or not. Thus, the three issues described in the conventional technology can be solved in the data receiver of the present disclosure.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data receiver, comprising:
a serial-data processing circuit, configured to receive a serial data, generate an operation clock according to the serial data, and dynamically modulate a frequency of the operation clock until the frequency of the operation clock is locked in a correct frequency, the serial-data processing circuit being further configured to restore the serial data back to a parallel data according to the operation clock, and perform a data latch operation on the parallel data according to the operation clock thereby restoring the parallel data back to a required data, the serial-data processing circuit being further configured to determine whether the frequency of the operation clock is correct or not and accordingly generate a first determination result, and determine, according to a reset control signal, whether to re-generate the operation clock or not according to the serial data;
a null-frequency detecting circuit, electrically coupled to the serial-data processing circuit and configured to receive the operation clock, determine whether the received operation clock is locked or null, and accordingly output a second determination result;
a data checking circuit, electrically coupled to the serial-data processing circuit and configured to be either enabled or disabled according to the first determination result, the enabled data checking circuit being configured to obtain a checking data contained in the required data according to the operation clock, determine whether the checking data is correct or not, and accordingly output a third determination result;
a state control circuit, electrically coupled to the serial-data processing circuit and configured to output a frequency-locked indication signal and change a state of the frequency-locked indication signal according to the first, second and third determination results; and
a timeout detecting circuit, electrically coupled to an output terminal of the status control circuit and configured to determine whether the state of the frequency-locked indication signal is not converted into a predetermined state in a predetermined time or not and generate the reset control signal when the state of the frequency-locked indication signal is not converted into the predetermined state in the predetermined time.

2. The data receiver according to claim 1, wherein the serial-data processing circuit comprises:
a signal receiving circuit, configured to receive and output the serial data;
a clock recovery circuit, electrically coupled to an output terminal of the signal receiving circuit and configured to generate the operation clock according to the serial data, the clock recovery circuit being further configured to determine whether to be reset or not according to the reset control signal;
a de-serialize circuit, electrically coupled to the output terminal of the signal receiving circuit and an output terminal of the clock recovery circuit, the de-serialize circuit being configured to perform a de-serialize operation on the serial data according to the operation clock thereby restoring the serial data back to the parallel data;
a data restore circuit, electrically coupled to an output terminal of the de-serialize circuit and the output terminal of the clock recovery circuit, the data recovery circuit being configured to perform the data latch operation on the parallel data according to the operation clock thereby restoring the parallel data back to the required data; and a time counting circuit, electrically coupled to the output terminal of the clock recovery circuit and configured to receive and output the operation clock, determine whether the frequency of the operation clock is correct or not, and accordingly generate the first determination result.

3. The data receiver according to claim 2, wherein the de-serialize circuit comprises:
an N-to-M bit decoding circuit, electrically coupled to the output terminal of the signal receiving circuit and the output terminal of the clock recovery circuit, the N-to-M bit decoding circuit being configured to perform a decoding operation on an output signal of the signal receiving circuit according to the operation clock, wherein N and M are positive integers, and N>M;
a descrambling circuit, electrically coupled to an output terminal of the N-to-M bit decoding circuit and the output terminal of the clock recovery circuit, the descrambling circuit being configured to perform a descrambling operation on an output signal of the N-to-M bit decoding circuit according to the operation clock; and
a serial-to-parallel converter, electrically coupled to an output terminal of the descrambling circuit and the output terminal of the clock recovery circuit, the serial-to-parallel converter being configured to perform a serial-to-parallel operation on an output signal of the descrambling circuit according to the operation clock thereby generating the parallel data.

4. The data receiver according to claim 2, wherein the clock recovery circuit comprises a phase locked loop, the phase locked loop is electrically coupled to the output terminal of the signal receiving circuit and configured to generate the operation clock, compare a phase difference between the serial data and the operation clock, and accordingly dynamically modulate the frequency of the operation clock.

5. The data receiver according to claim 2, wherein the clock recovery circuit comprises a delay locked loop, the delay locked loop is electrically coupled to the output terminal of the signal receiving circuit and configured to generate the operation clock, compare a phase difference between the serial data and the operation clock, and accordingly dynamically modulate the frequency of the operation clock.

6. The data receiver according to claim 2, further comprising an equalizer, electrically coupled between the serial data and the input terminal of the signal receiving circuit.

7. The data receiver according to claim 1, wherein the timeout detecting circuit comprises a plurality of serially-coupled D-type flip-flops, each D-type flip-flop comprises a data input terminal, a clock input terminal, a data output terminal, a complementary data output terminal and a reset signal input terminal, each D-type flip-flop is configured to have its reset signal input terminal for receiving the frequency-locked indication signal and its data input terminal electrically coupled to its complementary data output terminal, wherein a first stage of the plurality of serially-coupled D-type flip-flops is configured to have its clock input terminal for receiving a reference clock, each D-type flip-flop except of the first stage is configured to have its clock input terminal electrically coupled to the data output terminal of the previous-stage D-type flip-flop, a last stage of the plurality of serially-coupled D-type flip-flops is configured to have its data output terminal for outputting the reset control signal.

8. The data receiver according to claim 1, wherein the null-frequency detecting circuit comprises:
a first D-type flip-flop, comprising a data input terminal, a clock input terminal, a data output terminal and a reset signal input terminal, the first D-type flip-flop being configured to have its clock input terminal for receiving the operation clock and its reset signal input terminal for receiving a reference clock, wherein the reference clock has a frequency smaller than that of the operation clock;
a first inverter, configured to have its input terminal electrically coupled to the data output terminal of the first D-type flip-flop and its output terminal electrically coupled to the data input terminal of the first D-type flip-flop;
a second inverter, configured to have its input terminal electrically coupled to the output terminal of the first inverter;
a plurality of serially-coupled second D-type flip-flops, each second D-type flip-flop comprises a data input terminal, a clock input terminal, a data output terminal and a reset signal input terminal, each second D-type flip-flop is configured to have its reset signal input terminal electrically coupled to the output terminal of the second inverter and its clock input terminal for receiving the reference clock, wherein a first stage of the plurality of serially-coupled second D-type flip-flops is configured to have its data input terminal electrically coupled to a direct power source, each second D-type flip-flop except of the first stage is configured to have its data input terminal electrically coupled to the data output terminal of the previous-stage second D-type flip-flop; and
an AND gate, configured to receive the reference clock and an output signal outputted from the data output terminal of a last stage of the plurality of serially-coupled second D-type flip-flops and accordingly generate the second determination result.

* * * * *